(12) United States Patent
Trachewsky

(10) Patent No.: US 7,711,061 B2
(45) Date of Patent: May 4, 2010

(54) PREAMBLE FORMATS SUPPORTING HIGH-THROUGHPUT MIMO WLAN AND AUTO-DETECTION

(75) Inventor: Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 1192 days.

(21) Appl. No.: 11/261,250

(22) Filed: Oct. 28, 2005

(65) Prior Publication Data

US 2007/0047666 A1 Mar. 1, 2007

Related U.S. Application Data

(60) Provisional application No. 60/711,169, filed on Aug. 24, 2005.

(51) Int. Cl.
*H04L 1/02* (2006.01)
(52) U.S. Cl. ........................ 375/267; 370/465
(58) Field of Classification Search ............ 375/260, 375/267, 299; 370/252, 471, 465, 349, 208, 370/204, 264, 490, 487
See application file for complete search history.

(56) References Cited

U.S. PATENT DOCUMENTS

| 7,280,615 | B2* | 10/2007 | Roberts | 375/316 |
| 7,411,995 | B2* | 8/2008 | Kasher et al. | 375/141 |
| 2003/0193889 | A1* | 10/2003 | Jacobsen | 370/208 |
| 2005/0152473 | A1* | 7/2005 | Maltsev et al. | 375/299 |
| 2005/0174927 | A1* | 8/2005 | Stephens et al. | 370/206 |
| 2005/0276347 | A1* | 12/2005 | Mujtaba et al. | 375/299 |
| 2006/0140303 | A1* | 6/2006 | Egashira et al. | 375/299 |
| 2006/0176908 | A1* | 8/2006 | Kwon et al. | 370/473 |
| 2007/0253499 | A1* | 11/2007 | Waters et al. | 375/260 |

* cited by examiner

*Primary Examiner*—Chieh M Fan
*Assistant Examiner*—Aristocratis Fotakis
(74) *Attorney, Agent, or Firm*—Garlick Harrison & Markison; Bruce E. Garlick; Holly L. Rudnick

(57) ABSTRACT

A method for generating a preamble of an Orthogonal Frequency Division Multiplexed (OFDM) data frame for a multiple input multiple output (MIMO) wireless communication includes determining at least one system condition preamble format parameter. When the system condition preamble format parameter satisfies a first preamble format parameter a preamble having a first preamble format is formed. When the system condition preamble format parameter satisfies a second preamble format parameter, a preamble having a second preamble format is formed. Further, when the system condition preamble format parameter satisfies a third preamble format parameter, a preamble having a third preamble format is formed. The first, second, and third preamble formats differ based upon their lengths, fields, and modulation formats of a high throughput signal field.

6 Claims, 14 Drawing Sheets

PREAMBLE FORMATS SUPPORTING HIGH-THROUGHPUT MIMO WLAN AND AUTO-DETECTION

CROSS REFERENCE TO RELATED APPLICATION

This application claims priority to U.S. Provisional Patent Application Ser. No. 60/711,169, filed Aug. 24, 2005, which is incorporated herein by reference in its entirety for all purposes.

BACKGROUND OF THE INVENTION

1. Technical Field of the Invention

This invention relates generally to wireless communication systems and more particularly to supporting multiple wireless communication protocols within a wireless local area network.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

Heretofore, most systems of this type did not have sufficient flexibility in all aspects of operation, particularly in preamble structure, to satisfy system conditions that change over time. Therefore, a need exists for more flexibility in the operation of such wireless communication systems to adapt to changing system conditions and system requirements.

BRIEF SUMMARY OF THE INVENTION

The present invention is directed to apparatus and methods of operation that are further described in the following Brief Description of the Drawings, the Detailed Description of the Drawings, and the Claims. Other features and advantages of the present invention will become apparent from the following detailed description of the invention made with reference to the accompanying drawings.

DETAILED DESCRIPTION OF THE INVENTION

Figure 1:
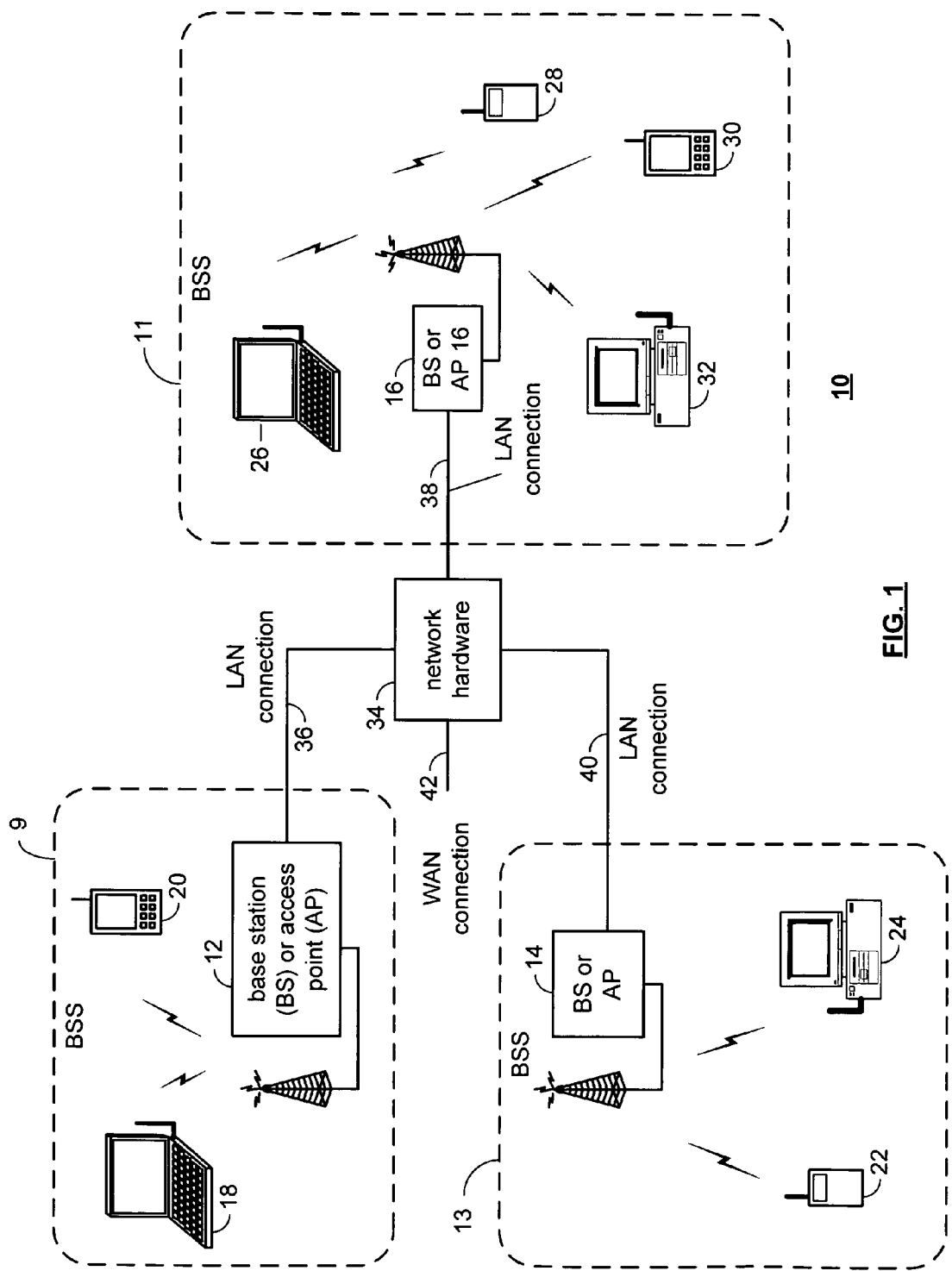
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12, 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
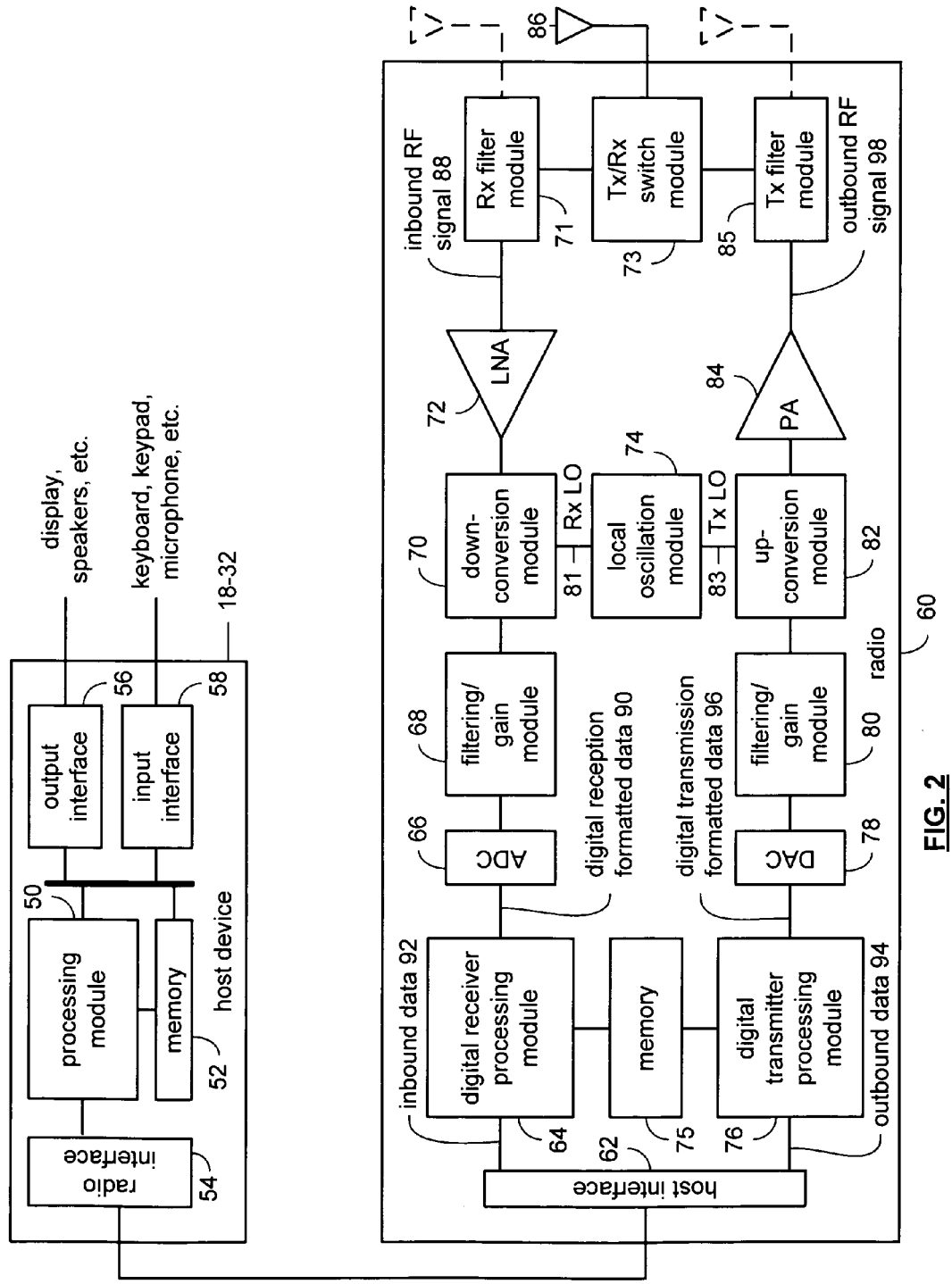
FIG. 2 is a schematic block diagram of a wireless communication device in accordance with the present invention.

FIG. 2 is a schematic block diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce digital transmission formatted data 96. The digital transmission formatted data 96 will be digital base-band signals (e.g., have a zero IF) or a digital low IF signals, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the digital reception formatted data to produce filtered inbound signals.

The analog-to-digital converter 66 converts the filtered inbound signals from the analog domain to the digital domain to produce digital reception formatted data 90, where the digital reception formatted data 90 will be digital base-band signals or digital low IF signals, where the low IF typically will be in the frequency range of one hundred kilohertz to a few megahertz. The digital receiver processing module 64, based on settings provided by the channel bandwidth adjust module 87, decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
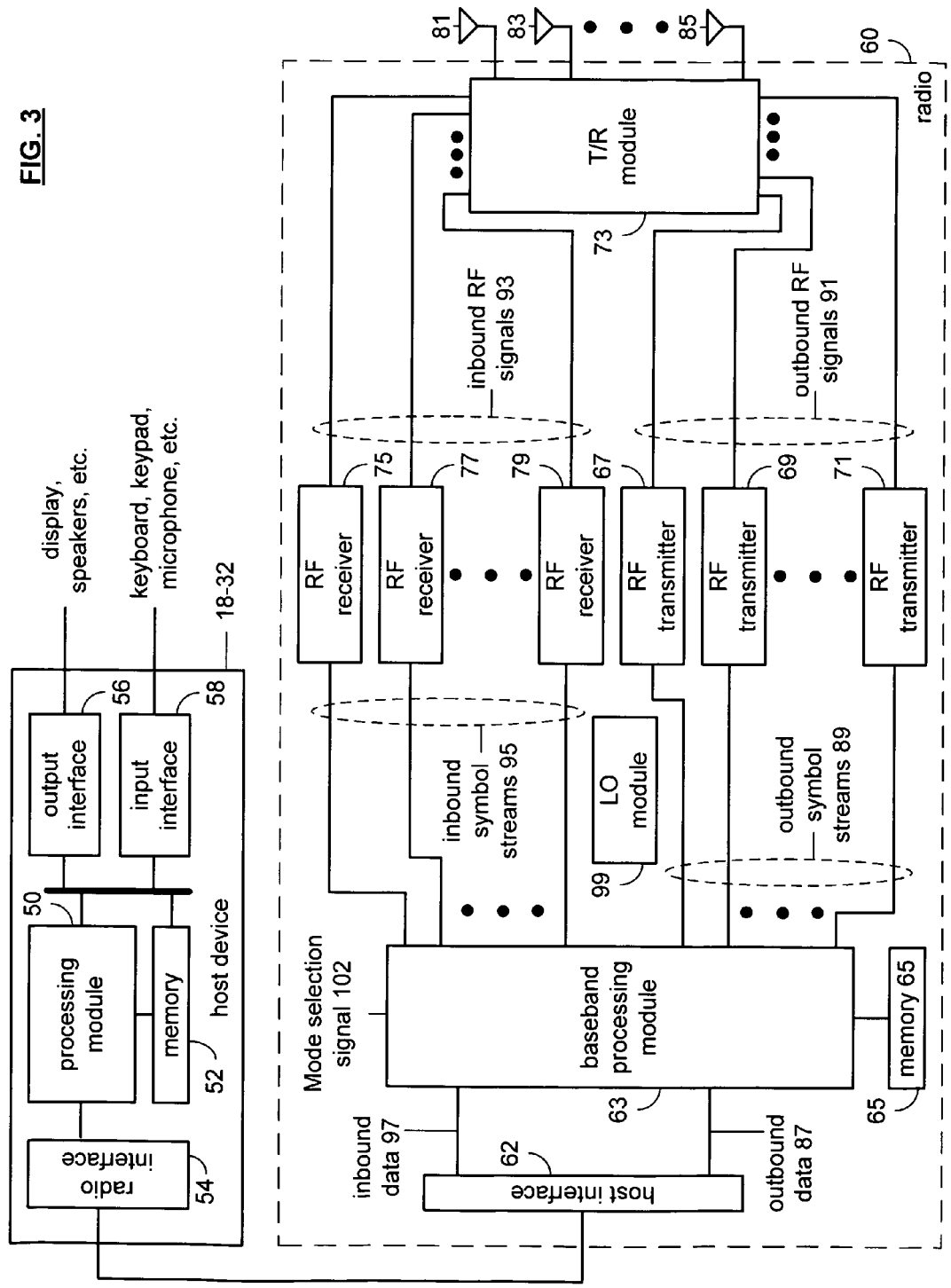
FIG. 3 is a schematic block diagram of another wireless communication device in accordance with the present invention.

FIG. 3 is a schematic block diagram illustrating another embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, encoding, scrambling, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal 102 will further indicate a particular rate ranging from 1 megabit-per-second to 54 megabits-per-second. In addition, the mode selection signal will indicate a particular type of modulation, which includes, but is not limited to, Barker Code Modulation, Binary Phase Shift Keying (BPSK), Quadrature Phase Shift Keying (QPSK), CCK, 16 Quadrature Amplitude Modulation (QAM) and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to up convert the outbound symbol streams 104 into outbound RF signals 112. In general, each of the RF transmitters 106-110 includes a digital filter and up sampling module, a digital to analog conversion module, an analog filter module, a frequency up conversion module, a power amplifier, and a radio frequency band pass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, down converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
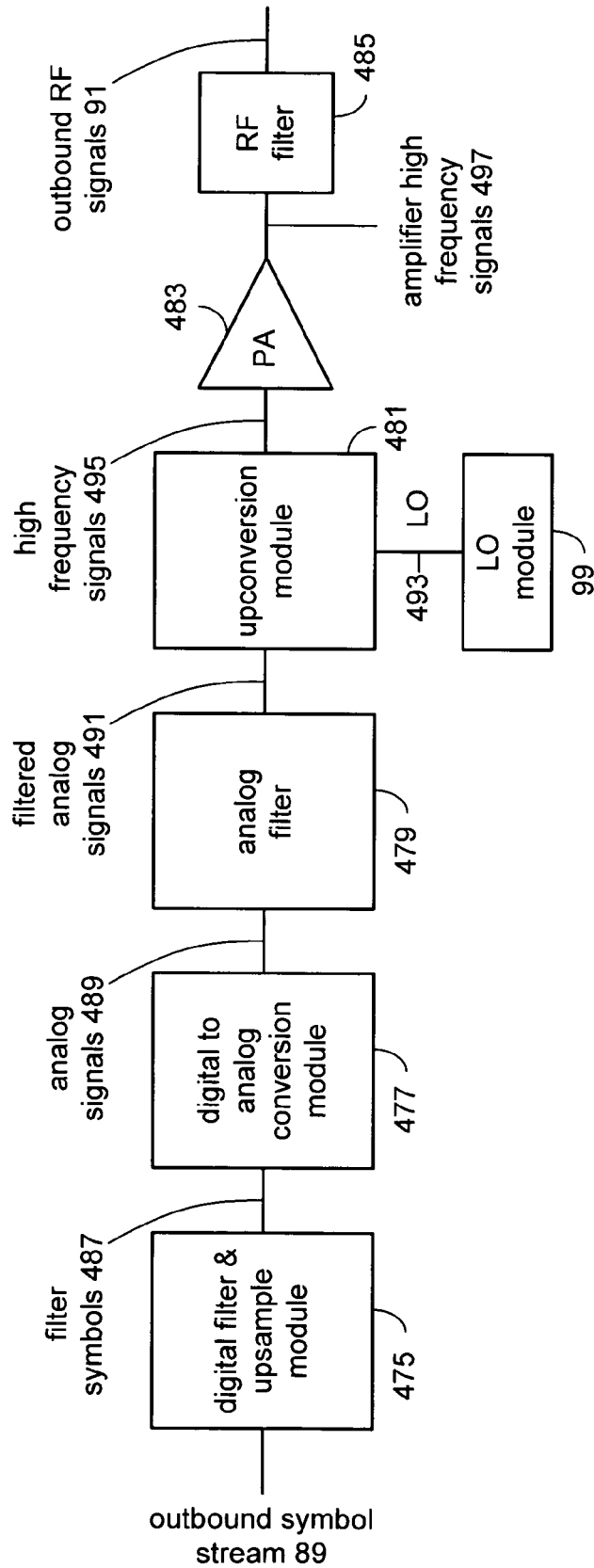
FIG. 4 is a schematic block diagram of an RF transmitter in accordance with the present invention.

FIG. 4 is a schematic block diagram of an embodiment of an RF transmitter 67, 69, 71. The RF transmitter includes a digital filter and up-sampling module 475, a digital-to-analog conversion module 477, an analog filter 479, and up-conversion module 81, a power amplifier 483 and a RF filter 485. The digital filter and up-sampling module 475 receives one of the outbound symbol streams 89 and digitally filters it and then up-samples the rate of the symbol streams to a desired rate to produce the filtered symbol streams 487. The digital-to-analog conversion module 477 converts the filtered symbols 487 into analog signals 489. The analog signals may include an in-phase component and a quadrature component.

The analog filter 479 filters the analog signals 489 to produce filtered analog signals 491. The up-conversion module 481, which may include a pair of mixers and a filter, mixes the filtered analog signals 491 with a local oscillation 493, which is produced by local oscillation module 99, to produce high frequency signals 495. The frequency of the high frequency signals 495 corresponds to the frequency of the RF signals 492. The power amplifier 483 amplifies the high frequency signals 495 to produce amplified high frequency signals 497. The RF filter 485, which may be a high frequency band-pass filter, filters the amplified high frequency signals 497 to produce the desired output RF signals 91.

As one of average skill in the art will appreciate, each of the radio frequency transmitters 67, 69, 71 will include a similar architecture as illustrated in FIG. 4 and further include a shut-down mechanism such that when the particular radio frequency transmitter is not required, it is disabled in such a manner that it does not produce interfering signals and/or noise.

Figure 5:
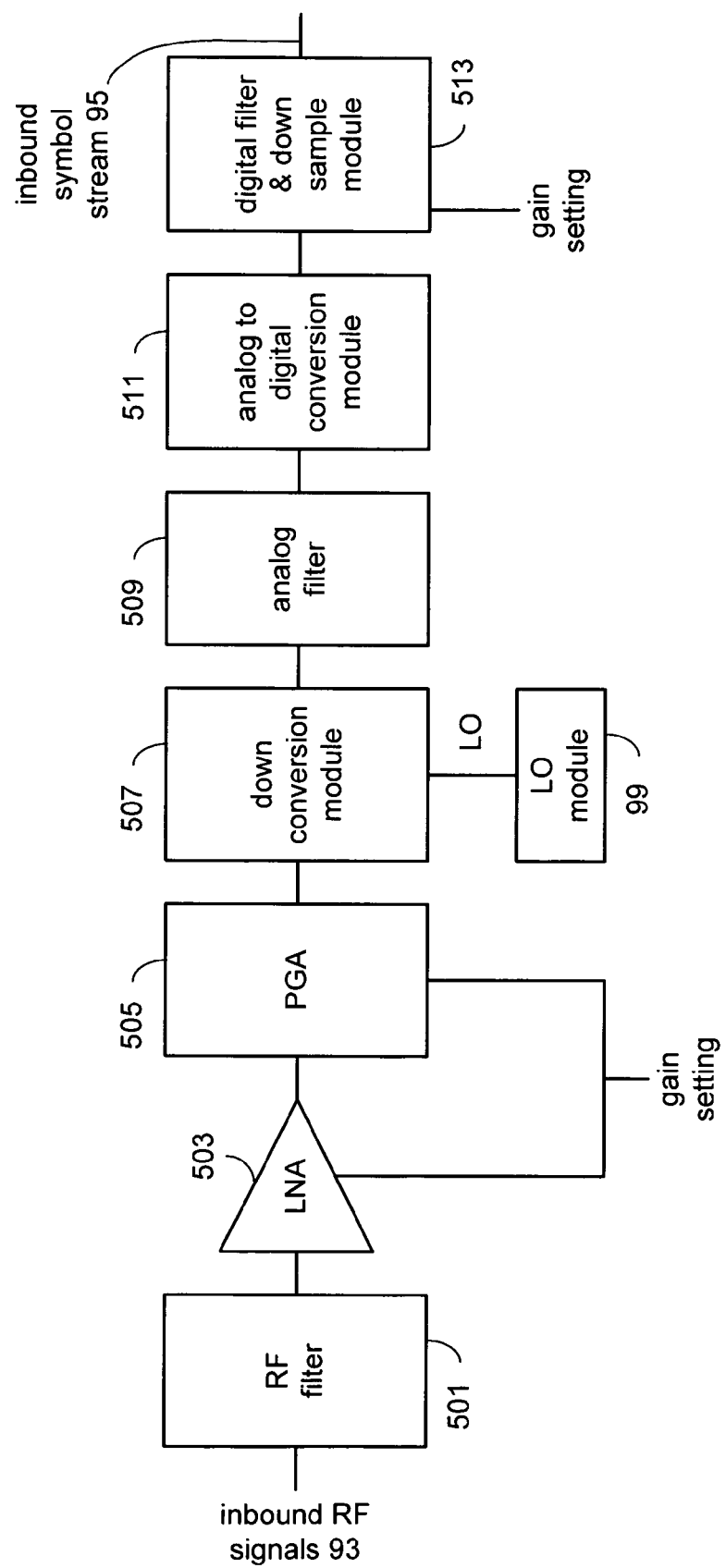
FIG. 5 is a schematic block diagram of an RF receiver in accordance with the present invention.

FIG. 5 is a schematic block diagram of each of the RF receivers 75, 77, 79. In this embodiment, each of the RF receivers includes an RF filter 501, a low noise amplifier (LNA) 503, a programmable gain amplifier (PGA) 505, a down-conversion module 507, an analog filter 509, an analog-to-digital conversion module 511 and a digital filter and down-sampling module 513. The RF filter 501, which may be a high frequency band-pass filter, receives the inbound RF signals 93 and filters them to produce filtered inbound RF signals. The low noise amplifier 503 amplifies the filtered inbound RF signals 93 based on a gain setting and provides the amplified signals to the programmable gain amplifier 505. The programmable gain amplifier further amplifies the inbound RF signals 93 before providing them to the down-conversion module 507.

The down-conversion module 507 includes a pair of mixers, a summation module, and a filter to mix the inbound RF signals with a local oscillation (LO) that is provided by the local oscillation module to produce analog baseband signals. The analog filter 509 filters the analog baseband signals and provides them to the analog-to-digital conversion module 511 which converts them into a digital signal. The digital filter and down-sampling module 513 filters the digital signals and then adjusts the sampling rate to produce the inbound symbol stream 95.

Figure 6:
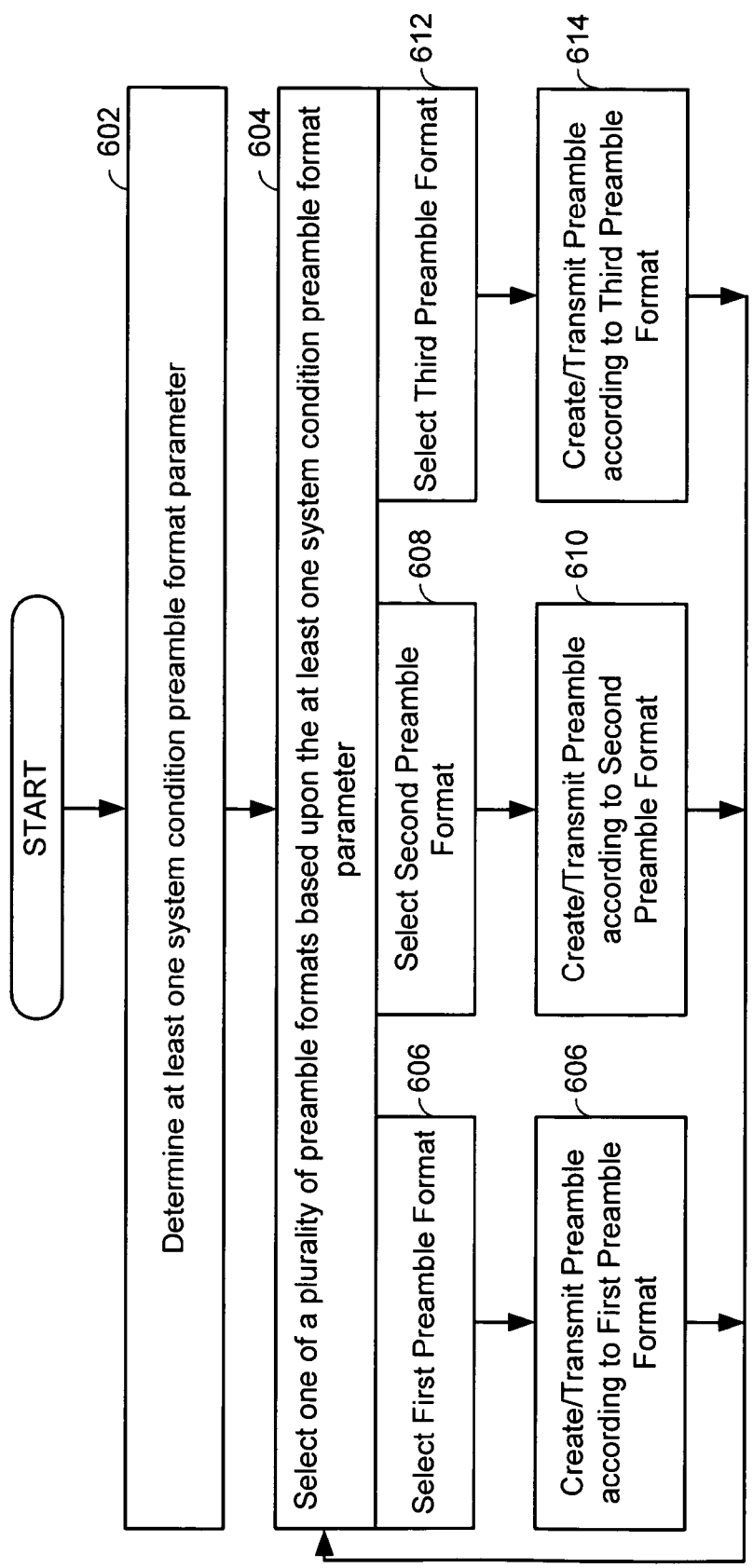
FIG. 6 is a flow chart illustrating a method for forming a preamble according to and embodiment of the present invention.

FIG. 6 is a flow chart illustrating a method for forming a preamble according to and embodiment of the present invention. The operations 600 of the embodiment of FIG. 6 are described with reference to a MIMO wireless communications system using an OFDM baseband signal format. The principles and teachings of FIG. 6 would apply to other types of communications systems as well.

Operation 600 commences with determining at least one system condition preamble format parameter (step 602). Operation then includes selecting one of a plurality of preamble formats based upon the preamble format parameter (step 604). This operation may include selecting a particular high throughput signal field (HT-SIG field) format. When a first preamble format is selected (step 606), operation includes creating/transmitting a preamble according to the first preamble format (step 608). One embodiment of the first preamble format will be described with reference to FIG. 7. When a second preamble format is selected (step 608), operation includes creating/transmitting a preamble according to the first preamble format (step 610). One embodiment of the second preamble format will be described with reference to FIG. 8. When a third preamble format is selected (step 612), operation includes creating/transmitting a preamble according to the third preamble format (step 614). One embodiment of the third preamble format will be described with reference to FIG. 9. Generally, each preamble format differs from each other preamble format, as will be described further below. Differences among the preamble formats may include differences in preamble lengths, differences in field lengths, differences in the field structure of the preambles, differences in the number of fields of the preambles, differences in the durations of the preambles, and differences in the modulations and/or encodings of the high throughput signal field of the preambles, among other possible differences.

According to one particular aspect of the embodiment of FIG. 6, the first preamble format includes a legacy short training field, a legacy long training field, a legacy signal field, a high throughput signal field having a first duration and modulation, and a high throughput long training field. In such case, the second preamble format includes a legacy short training field, a legacy long training field, a legacy signal field, a high throughput signal field having a second duration and modulation, and a high throughput long training field. Further, in such case, the third preamble format includes a legacy short training field, a legacy long training field, a legacy signal field, a high throughput signal field having a third duration and modulation, and at least one high throughput long training field.

According to another particular aspect of the embodiment of FIG. 6, each of the preamble formats includes a respective modulation format for a high throughput signal field of the preamble. With one particular example of this aspect, the at least one system condition preamble format parameter includes a channel signal to noise ratio (SNR) between a transmitting MIMO wireless device and a receiving MIMO wireless device. With this example, when a relatively higher channel SNR exists, using a relatively higher order modulation for the high throughput signal field. Further, when a relatively lower channel SNR exists, using a relatively lower order modulation for the high throughput signal field. Extending this concept to the three preamble format embodiment of FIG. 6, a high throughput signal field of the first preamble format includes one QPSK OFDM symbol, a high throughput signal field of the second preamble format includes two BPSK OFDM symbols that are both rotated by 90 degrees, and a high throughput signal field of the third preamble format includes two BPSK OFDM symbols, one of which is rotated by 90 degrees. Rotation of the BPSK OFDM symbols may be by positive 90 degrees or by negative 90 degrees.

According to another aspect of FIG. 6, when the at least one system condition preamble format parameter indicates that the preamble will be used for clear channel assessment by a non-data-receiving MIMO wireless device, a relatively longer preamble is employed. Further, when the at least one system condition preamble format parameter indicates that the preamble will not be used for clear channel assessment by a non-data-receiving MIMO wireless device, a relatively shorter preamble is employed.

According to the present invention, the first preamble format is selected when a highest throughput is required, the second preamble format is selected when long range operations are required, and the third preamble format is selected for maximum backward-compatibility when also performing transmit beamforming. With the third preamble format selected, auto-detection at the receiver is favored. With the preambles of the present invention, best network performance under different system conditions is met while the preambles are distinguishable automatically at the receiver.

Formation of the preambles according to the present invention makes use of the following definitions:

Guard interval=cyclic prefix of an OFDM symbol; the last N_guard samples of the IFFT output prepended to the beginning of the first sample of the IFFT output.

N_ss=number of spatial streams (independent data streams that may be sent over the air in the same space, time and frequency band).

N_tx=number of transmitter RF paths.

L-STF=legacy (IEEE 802.11a or 802.11g) short training field, which comprises 10 identical symbols each of 800 nsec duration. The L-STF is typically used for carrier detection, AGC, and coarse carrier frequency offset estimation.

L-LTF=legacy (IEEE 802.11a or 802.11g) long training field, which comprises 2 identical symbols each of 3200 nsec duration, preceded by a 1600 nsec double-length guard interval. The L-LTF is typically used for fine carrier frequency offset estimation, initial sampling frequency offset estimation, initial FFT window placement and channel estimation.

L-SIG=legacy (IEEE 802.11a or 802.11g) signal field, which comprises one symbol of 4 usec duration inclusive of an 800-nsec guard interval. The L-SIG field includes information about the payload physical-layer rate and the frame length.

TX beamforming is a process in which the output of each N_ss element vector corresponding to each OFDM subcarrier index k is multiplied by an N_tx×N_ss element matrix, P(k).

HT-STF=high-throughput short-training field. The HT-STF field is typically used for re-AGC of the received input sequence on a transition from a non-beamformed prefix to a beamformed portion of the frame.

HT-LTF=high-throughput long-training field. The HT-LTF field is used for MIMO channel estimation and may also be used for fine carrier frequency offset estimation, sampling frequency offset estimation and FFT window placement. The HT-LTF field may be 4 or 8 usec in duration with 800 or 1600 nsec guard intervals.

HT-SIG=high-throughput signal field. The HT-SIG field contains MIMO physical-layer rate and length information as well as other possible information about the frame format.

CDD=cyclic delay diversity, which involves cyclically shifting the samples out of the IFFT on any of the streams, where the period of the cyclic shift (the modulus) is the number of points in the IFFT.

The Log-Likelihood Ratio (LLR) of a bit b is given by:

$$LLR(b) = \log\left[\frac{Pr\{b = +1|x\}}{Pr\{b = -1|x\}}\right]$$

Figure 7A:
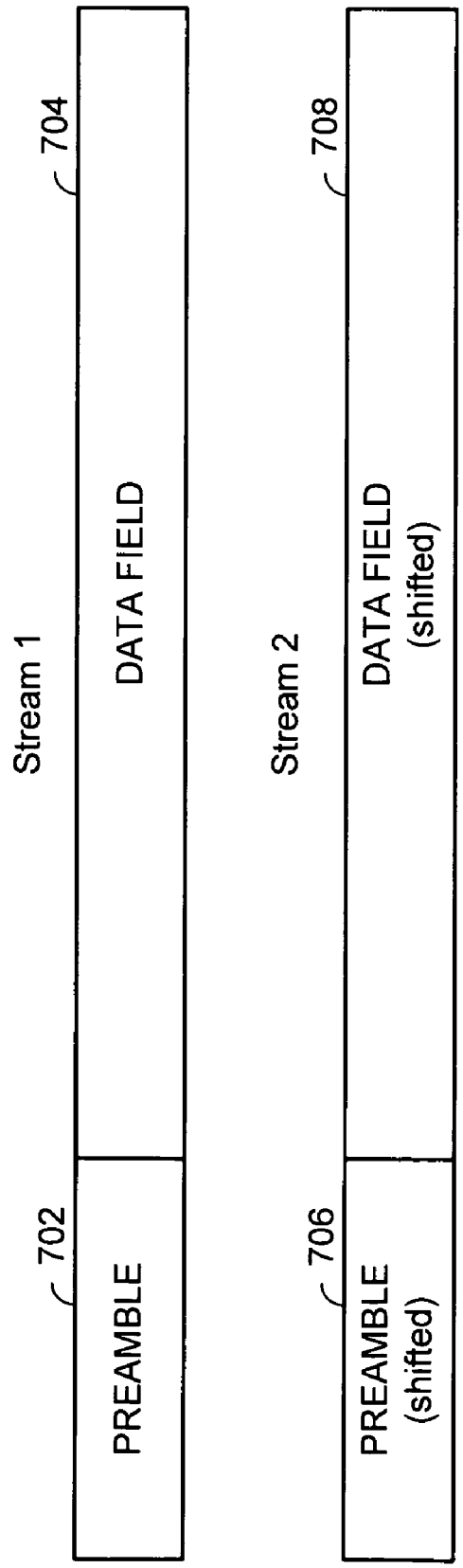
FIG. 7A is block diagram illustrating a data frame format according to the present invention

FIG. 7A is block diagram illustrating a data frame format according to the present invention. As shown, the data frame 700 includes two streams, stream 1, and stream 2. Stream 1 includes a preamble 702 and a data field 704. Stream 2 includes a preamble 706 and a data field 708 that have been shifted using a time orthogonal shifting format and/or a CCD shifting format. The concepts of FIG. 7A, as well as those of FIGS. 7B, 8, and 9 may be extended to N streams, as was previously described with reference to FIG. 3.

Figure 7B:
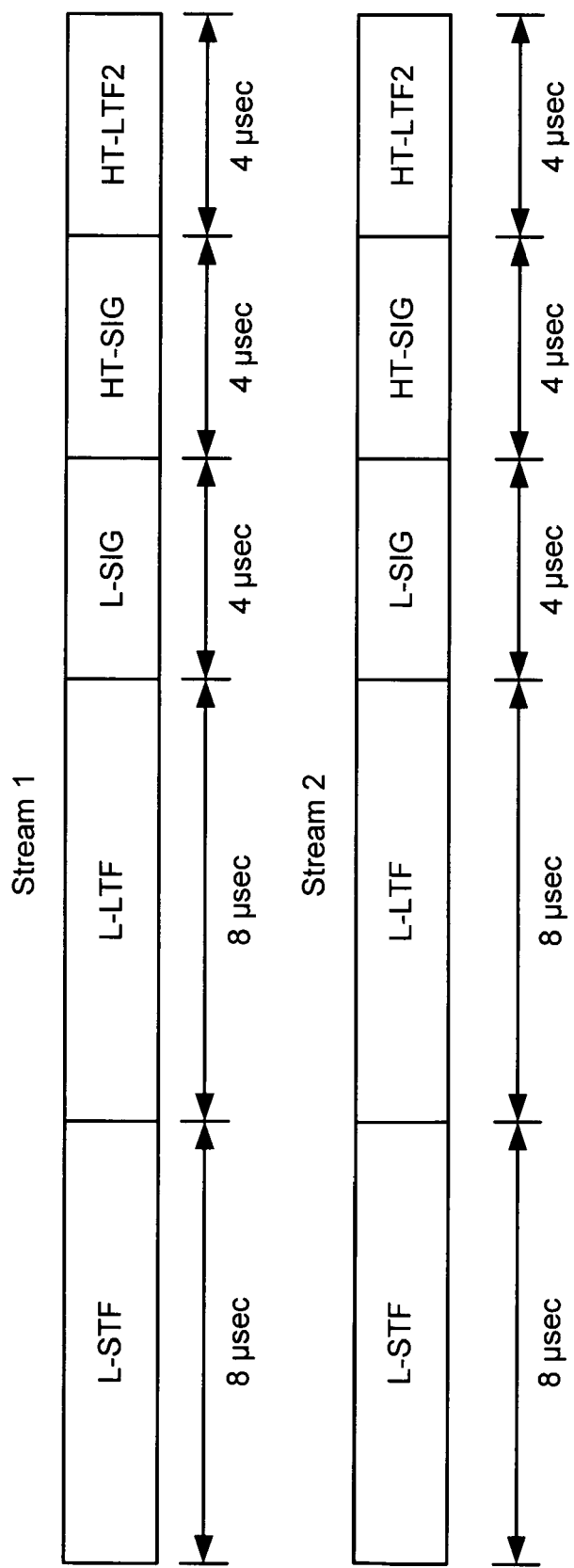
FIG. 7B is block diagram illustrating a first preamble format according to an embodiment of the present invention.

FIG. 7B is block diagram illustrating a first preamble format according to an embodiment of the present invention. Each of streams 1 and 2 of the first preamble format include L-STF fields, L-LTF fields, L-SIG fields, HT-SIG fields, and HT-LTF2 fields. With the first preamble format of FIG. 7B, the L-LTF fields and the HT-LTF2 fields use time-orthogonal and/or CDD shifting formats for the two streams. With the first preamble format of FIG. 7B, the HT-LTF1 field=the L-LTF field. The preamble format of FIG. 7B supports straightforward single-stream channel estimation that may be used for decoding the HT-SIG field. The channel estimate for decoding the HT-SIG is a simple SISO (legacy) channel estimate. With the first preamble format of FIG. 7B, the HT-SIG field is encoded using QPSK modulation using a 64-state binary convolutional code at rate=½. The encoding for this preamble format may employ an IEEE 802.11a convolutional code. Further, the L-SIG may specify a physical layer rate of 6 Mbps.

Figure 8:
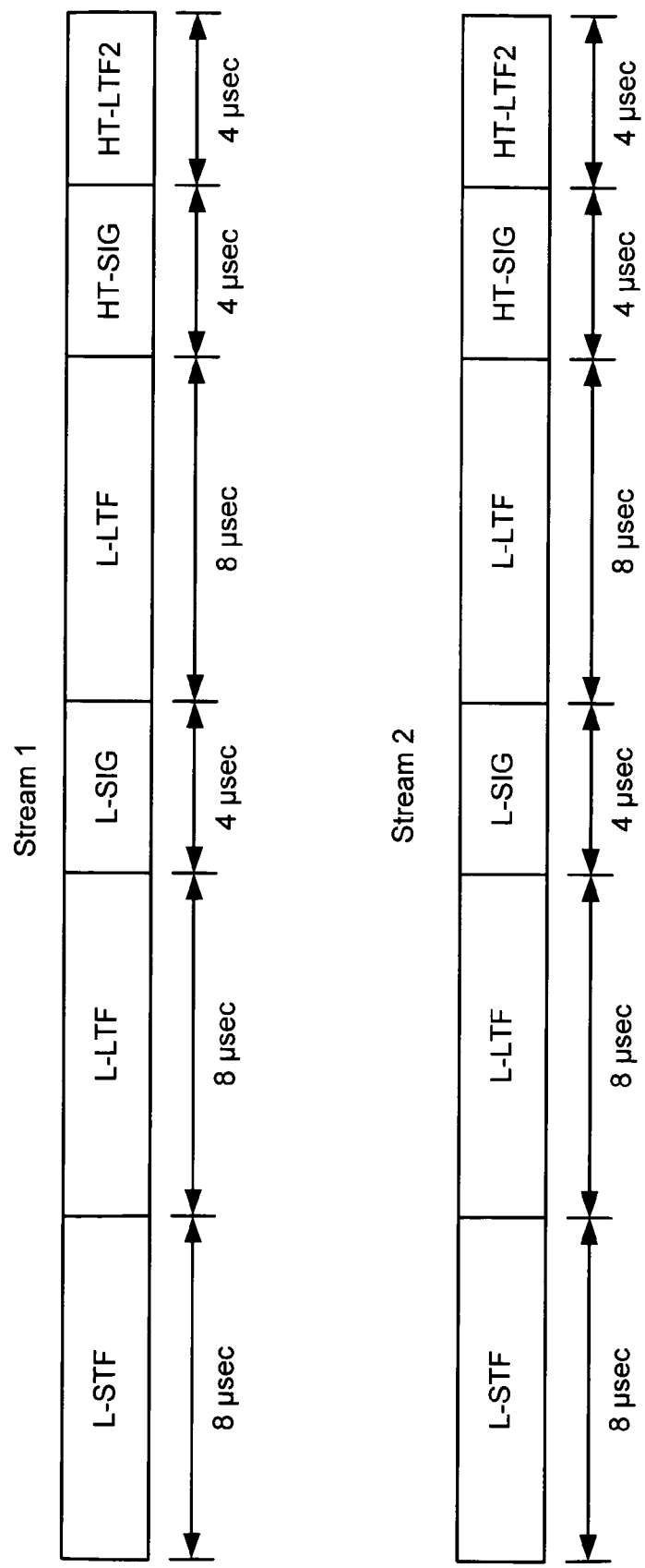
FIG. 8 is block diagram illustrating a second preamble format according to an embodiment of the present invention.

FIG. 8 is block diagram illustrating a second preamble format according to an embodiment of the present invention. Each of streams 1 and 2 of the second preamble format include L-STF fields, L-LTF fields, L-SIG fields, HT-SIG fields, and HT-LTF2 fields. With the third preamble format of FIG. 8, the L-LTF fields and the HT-LTF2 fields use time-orthogonal and/or CDD shifting formats for the two streams. With the first preamble format of FIG. 8, the HT-LTF1 field=the L-LTF field. The preamble format of FIG. 8 supports straightforward single-stream channel estimation that may be used for decoding the HT-SIG field. The channel estimate for decoding the HT-SIG is a simple SISO (legacy) channel estimate. The HT-SIG field includes two contiguous 4-usec symbols encoded as 90-degree rotated BPSK (i.e., +/−sqrt(−1) instead of +/−1 values) using a 64-state binary convolutional code at rate=½. The encoding for this preamble format may employ an IEEE 802.11a convolutional code. The guard interval of the HT-SIG field is 800 nanoseconds.

Figure 9:
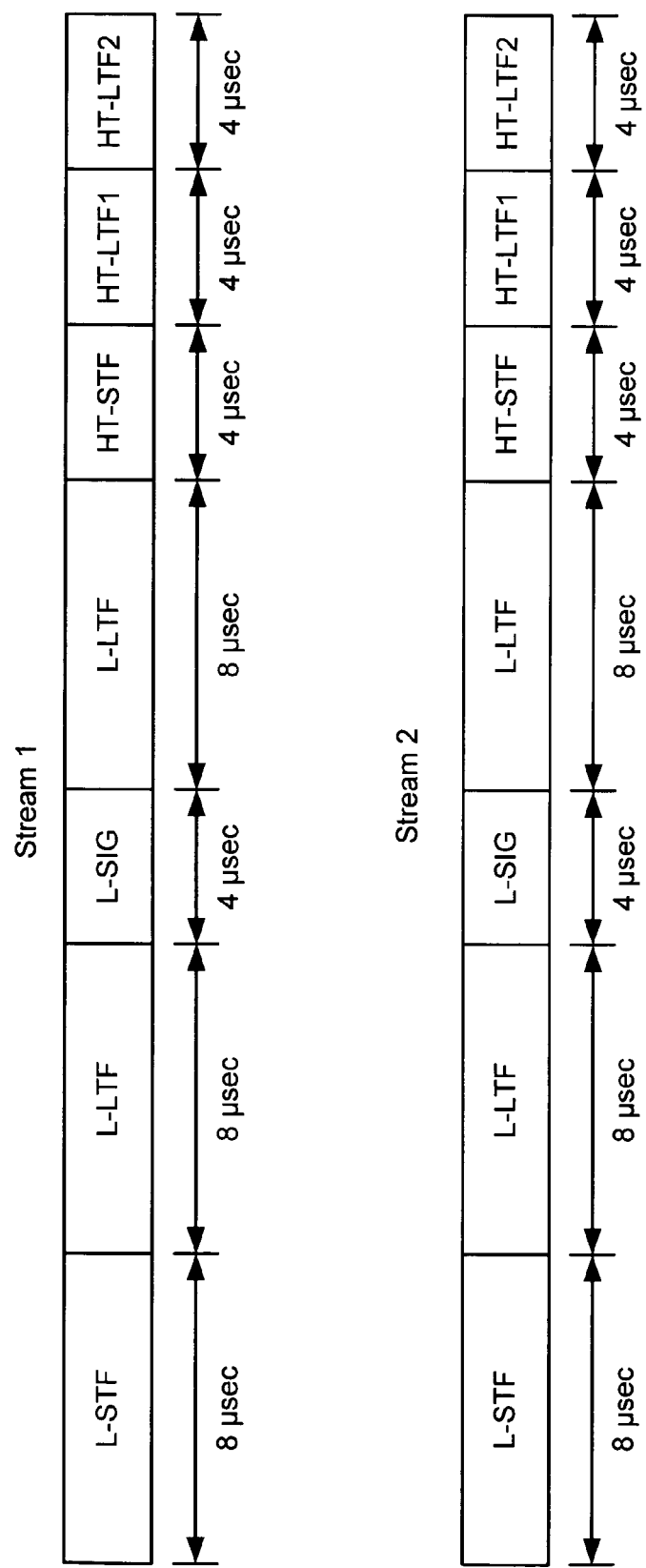
FIG. 9 is block diagram illustrating a third preamble format according to an embodiment of the present invention.

FIG. 9 is block diagram illustrating a third preamble format according to an embodiment of the present invention. Each of streams 1 and 2 of the first preamble format include L-STF fields, L-LTF fields, L-SIG fields, HT-SIG fields, HT-LTF1 fields, and HT-LTF2 fields. With the third preamble format of FIG. 9, the L-LTF fields, the HT-LTF1 fields, and HT-LTF2 fields use time-orthogonal and/or CDD shifting formats for the two streams. With the first preamble format of FIG. 9, the HT-LTF1 field=the L-LTF field. The preamble format of FIG. 9 supports straightforward single-stream channel estimation that may be used for decoding the HT-SIG field. The channel estimate is for decoding HT-SIG is a simple SISO (legacy) channel estimate. The HT-SIG field includes two contiguous 4-usec symbols. The first symbol is encoded as 90-degree rotated BPSK symbol (i.e., +/−sqrt(−1) instead of +/−1 values) using a 64-state binary convolutional code at rate=½. The guard interval is 800 nsec The second symbol is encoded as an unrotated BPSK (i.e., +/−1) symbol using a 64-state binary convolutional code at rate=½ using as its initial state the final state at the end of the encoding of the first HT-SIG symbol. The encoding for this preamble format may employ an IEEE 802.11a convolutional code.

The preamble formats of FIGS. 7B, 8 and 9, all assumed that the number of symbol streams equals two, i.e., N_ss=2. With N_ss=1, 3, and 4, the following apply:

For N_ss=1, HT-LTF2 is deleted with respect to FIGS. 7B, 8, and 9.

For N_ss=3 and 4, there are 1 or 2 additional spatial streams and an HT-LTF3 and an HT-LTF4, each of 4- or 8-usec duration and 800- or 1600-nsec guard interval are added.

4-usec total duration and 800-nsec guard interval is preferred.

Figure 10:
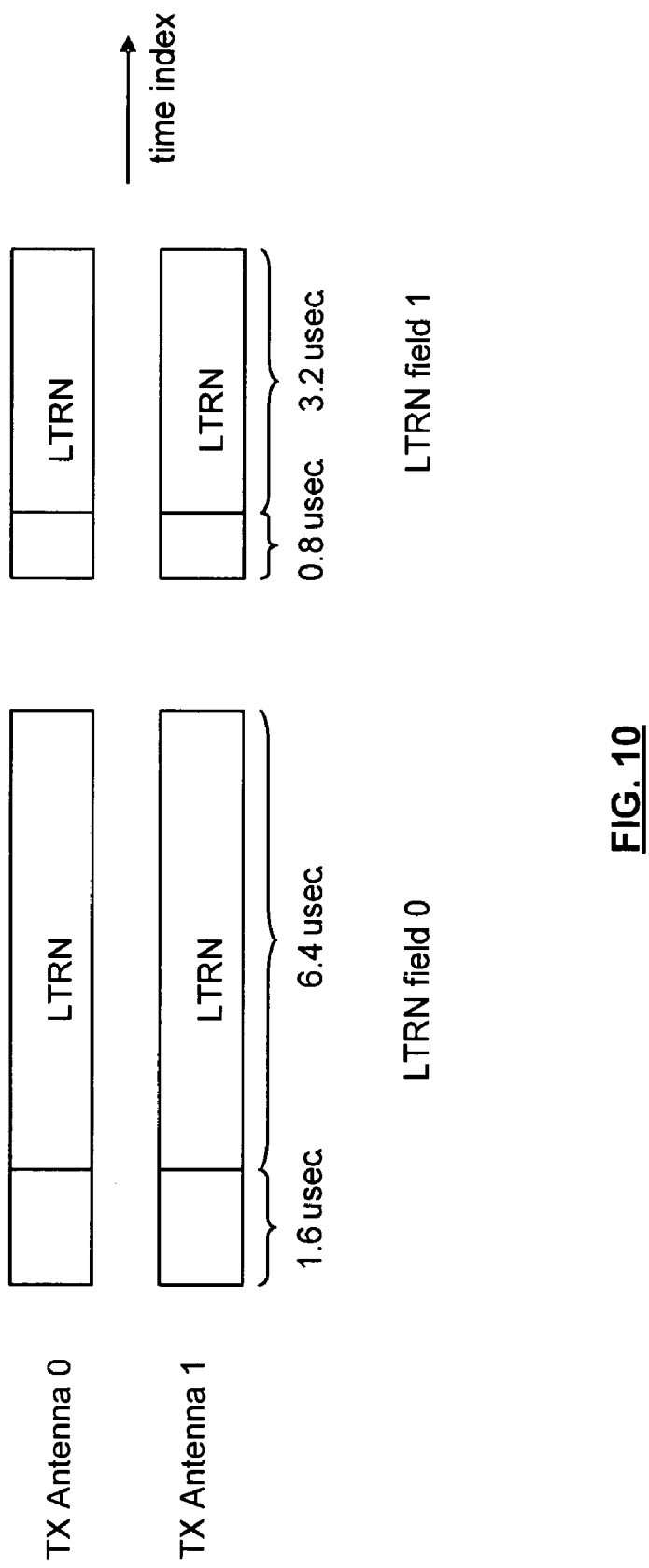
FIG. 10 is block diagram illustrating LTF fields of preambles according to an embodiment of the present invention.

FIG. 10 is block diagram illustrating LTF fields of preambles according to an embodiment of the present invention. These LTF fields have a Time-Orthogonal Format. Further, a per-subcarrier phase shift (CDD) is applied on the second tx antenna (second stream) to avoid large received power fluctuations due to beamforming. With this per-subcarrier phase shift, $$S_{0,k}^{(0)} = LTRN_k, S_{0,k}^{(1)} = LTRN_k, S_{1,k}^{(0)} = e^{i \cdot \phi k} \cdot LTRN_k, S_{1,k}^{(1)} = -e^{i \cdot 100 \cdot k} LTRN_k$$

where LTRN is some base training sequence and the subcarrier index is k. The per-subcarrier phase shift may be implemented by cyclic shifts.

For a time-orthogonal preamble, any constant times a unitary matrix may be used to multiply the legacy long-training symbols. In the previous example, a Walsh-Hadamard matrix was employed. Another example of a rotation matrix that provides the phase shift function is:

$$P_{HILTF} = \begin{pmatrix} 1 & -1 & 1 & 1 \\ 1 & 1 & -1 & 1 \\ 1 & 1 & 1 & -1 \\ -1 & 1 & 1 & 1 \end{pmatrix}$$

Note that for the 2-stream case, the upper left-most 2×2 sub-matrix is selected. Further, note that that any group of columns of $P_{HTLTF} * P_{HTLTF}^H$, where "H" indicates a Hermitian (complex-conjugate) transpose is equal to a constant times an identity matrix.

Figure 11:
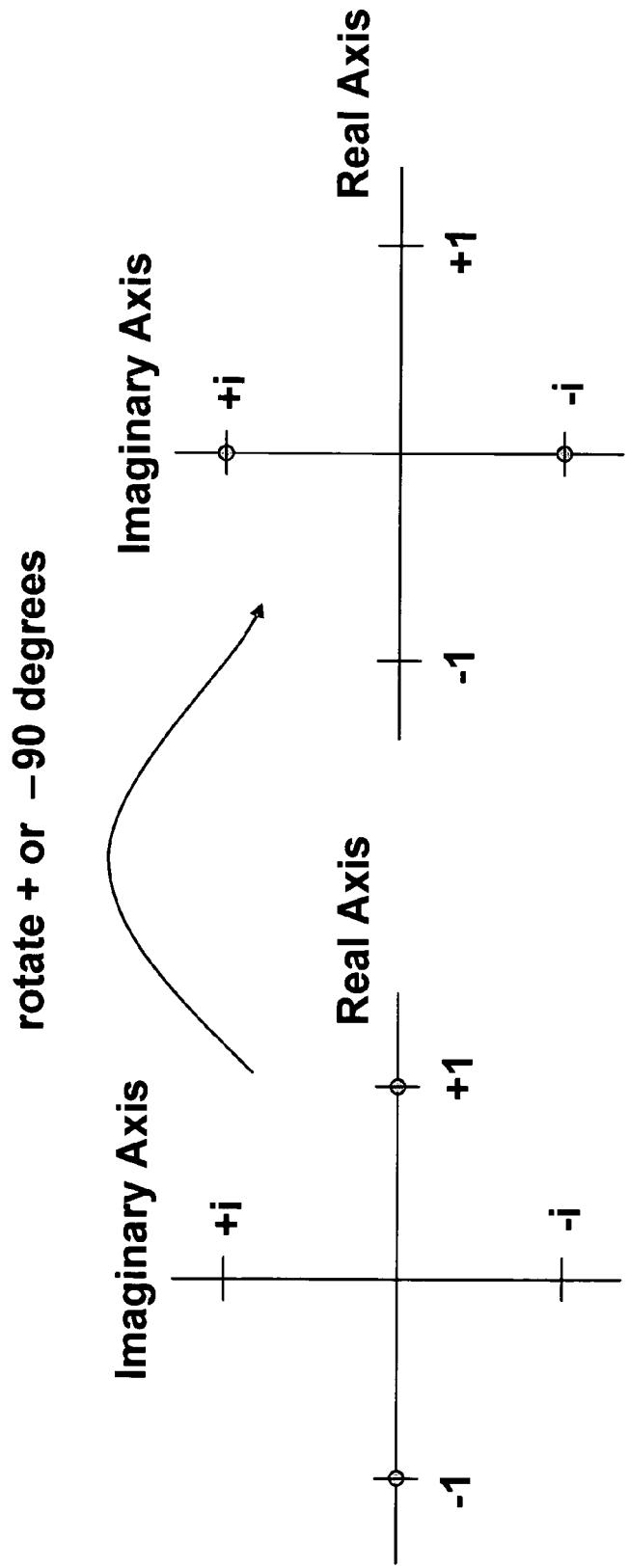
FIG. 11 is diagram illustrating rotation of BPSK symbols according to some aspects of the present invention.

FIG. 11 is diagram illustrating rotation of BPSK symbols according to some aspects of the present invention. This encoding is used on each OFDM subcarrier when required to rotate BPSK symbols of the HT-SIG field for a particular preamble format. Note that a rotation of +90 or −90 degrees may be employed depending upon the embodiment. Further, note that with the rotation, the receiving device must be able to sense two-dimensional modulation constellation formats.

Figure 12:
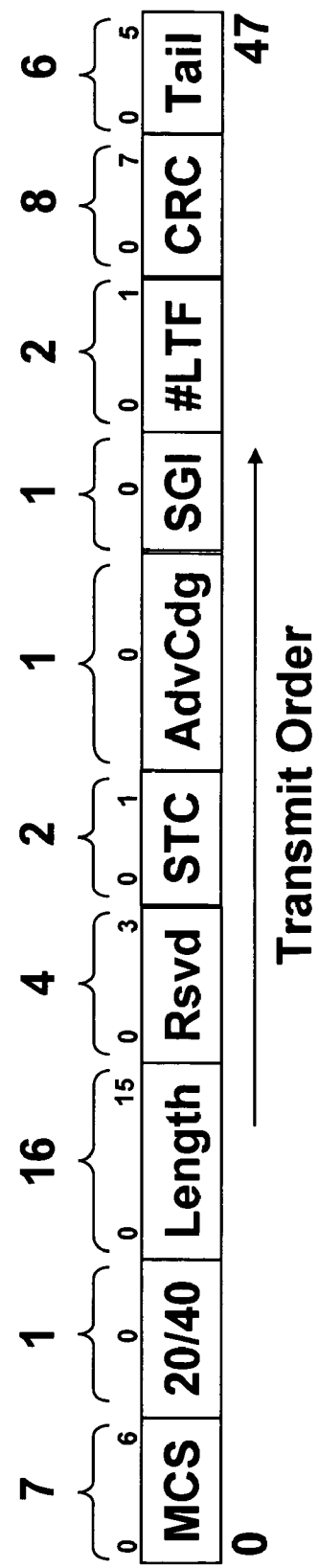
FIG. 12 is block diagram illustrating data fields of an HT-SIG field according to an embodiment of the present invention.
Figure 13:
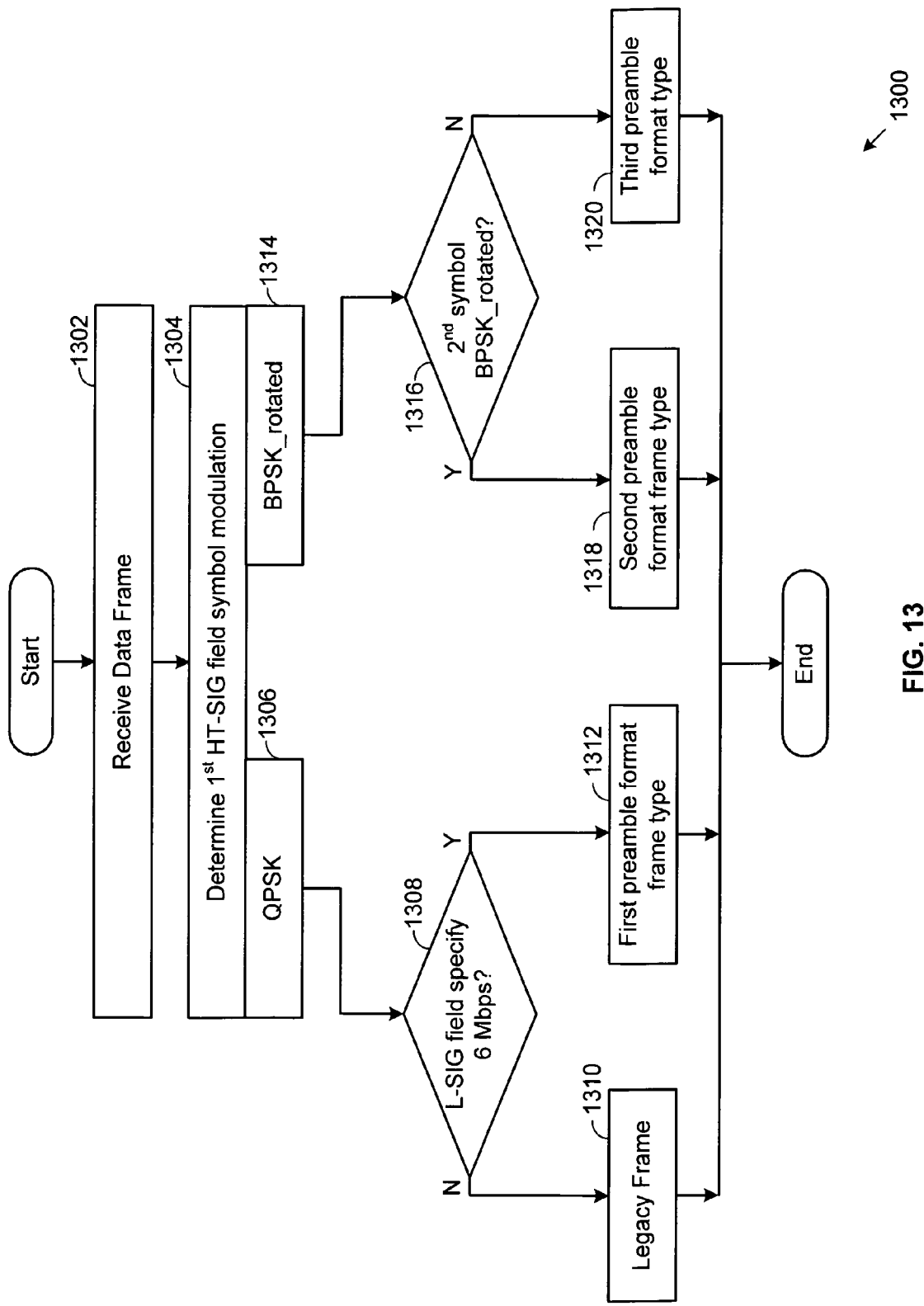
FIG. 13 is a flow chart illustrating an embodiment of a method of the present invention for determining a format of an OFDM data frame within a MIMO wireless communication by a wireless receiver.

FIG. 12 is block diagram illustrating data fields of an HT-SIG field according to an embodiment of the present invention. With the embodiment of FIG. 12, the HT-SIG field data fields include:

MCS: Modes 0-32 as defined in nSync spec #889-05; Modes 33-127 reserved
20/40: "0"=>20 MHz, "1"=>40 MHz
Length: # Octets in payload (not including SVC field); min Length=1
STC: # Chains used for Space-Time Coding—# spatial streams from MCS
AdvCdg: "0"=>802.11a BCC64, "1"=>Frame uses advanced coding
SGI: "0"=>¼-symbol Guard Interval, "1"=>⅛-symbol Guard Interval
LTF: Number of LTFs in frame (applicable to channel sounding frames only)
Reserved bits set to all "1s" to avoid a long string of zeros
CRC: CRC-8
Tail: Set to all 0s FIG. 13 is a flow chart illustrating an embodiment of a method of the present invention for determining a format of an OFDM data frame within a MIMO wireless communication by a wireless receiver. The method 1300 commences with receiving a data frame that includes a preamble and a data field (step 1302). Operation continues with determining a modulation format of a high throughput signal field (HT-SIG field) of the preamble (step 1304). In particular, the operation of step 1304 considers the modulation format of a 1$^{st}$ HT-SIG field modulation symbol. When the 1$^{st}$ HT-SIG field symbol modulation is QPSK (step 1306), operation continues with determining a data rate specified in the L-SIG field, e.g. 6 Mbps (step 1308). When the L-SIG field does not specify that the data rate is 6 Mbps (or another specific rate), the received data frame is a legacy frame (step 1310). However, when the L-SIG field specifies the particular data rate, e.g., 6 Mbps, the received preamble is of the first preamble format and the data frame is of a first type.

When the 1$^{st}$ HT-SIG field symbol modulation is BPSK_rotated (step 1314), operation continues with determining the modulation type of the 2$^{nd}$ symbol of the HT-SIG field, e.g. BPSK or BPSK_rotated (step 1316). When the 2$^{nd}$ symbol of the HT-SIG field is BPSK_rotated, the preamble is of the second preamble format and the data frame is of the second type (step 1318). However, when the 2$^{nd}$ symbol of the HT-SIG field is BPSK, the preamble is of the third preamble format and the data frame is of the third type (step 1320).

Stated generally, the method of the present invention determines: (1) when the high throughput signal field has a first modulation format, determining that the preamble is of a first preamble format and that the data frame is of a first type; (2) when the high throughput signal field has a second modulation format, determining that the preamble is of a second preamble format and that the data frame is of a second type; and (3) when the high throughput signal field has a third modulation format, determining that the preamble is of a third preamble format and that the data frame is of a third type. In determining a modulation format of the HT-SIG field, log likelihood ratios may be employed.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments for wireless communications in a wireless communication system that includes a plurality of wireless communication devices of differing protocols. As one of average skill in the art will appreciate, other embodiments may be derived from the teachings of the present invention without deviating from the scope of the claims.

What is claimed is:

1. A method for generating a preamble of a data frame for a multiple input multiple output (MIMO) wireless communication, the method comprising:

determining at least one system condition preamble format parameter, the at least one system condition preamble format parameter including a channel signal to noise ratio (SNR) between a transmitting MIMO wireless device and a receiving MIMO wireless device; and based upon the preamble format parameter, selecting one of a plurality of preamble formats, each preamble format including a respective format of a high throughput signal field, the selecting including:

for a first system condition preamble format parameter, using a first preamble format, the high throughput signal field of the first preamble format including one QPSK OFDM symbol;

for a second system condition preamble format parameter, using a second preamble format that differs from the first preamble format, the high throughput signal field of the second preamble format including two BPSK OFDM symbols that are both rotated by 90 degrees; and for a third system condition preamble format parameter, using a third preamble format that differs from both the first preamble format and the second preamble format, the high throughput signal field of the third preamble format including two BPSK OFDM symbols, one of which is rotated by 90 degrees;

the selecting further including:

when a relatively higher channel SNR exists, using a relatively higher order modulation for the high throughput signal field; and when a relatively lower channel SNR exists, using a relatively lower order modulation for the high throughput signal field.

2. The method of claim 1, wherein:

the first preamble format includes a legacy short training field, a legacy long training field, a legacy signal field, the high throughput signal field having a first duration and modulation, and a high throughput long training field;

the second preamble format includes a legacy short training field, a legacy long training field, a legacy signal field, the high throughput signal field having a second duration and modulation, and a high throughput long training field; and the third preamble format includes a legacy short training field, a legacy long training field, a legacy signal field, the high throughput signal field having a third duration and modulation, and at least one high throughput long training field.

3. The method of claim 1, wherein each of the plurality of preamble formats includes a differing modulation of the high throughput signal field.

4. A method for generating a preamble of an Orthogonal Frequency Division Multiplexed (OFDM) data frame for a multiple input multiple output (MIMO) wireless communication, the method comprising:

determining at least one system condition preamble format parameter, the at least one system condition preamble format parameter including a channel signal to noise ratio (SNR) between a transmitting MIMO wireless device and a receiving MIMO wireless device; and when the system condition preamble format parameter satisfies a first preamble format parameter, forming a preamble having a first preamble format that includes a legacy short training field, a legacy long training field, a legacy signal field, a high throughput signal field, and at least one high throughput training field, the high throughput signal field formed according to a first modulation format and including one QPSK OFDM symbol;

when the system condition preamble format parameter satisfies a second preamble format parameter, forming a preamble having a second preamble format that includes a legacy short training field, a legacy long training field, a legacy signal field, a high throughput signal field, and at least one high throughput training field, the high throughput signal field formed according to a second modulation format that differs from the first modulation format and including two BPSK OFDM symbols that are both rotated by 90 degrees; and when the system condition preamble format parameter satisfies a third preamble format parameter, forming a preamble having a third preamble format that includes a legacy short training field, a legacy long training field, a legacy signal field, a high throughput signal field, and at least one high throughput training field, the high throughput signal field formed according to a third modulation format that differs from both the first modulation format and the second modulation format and includes two BPSK OFDM symbols, one of which is rotated by 90 degrees;

wherein the first preamble format, the second preamble format and the third preamble format are selected such that:

when a relatively higher channel SNR exists, using a relatively higher order modulation for the high throughput signal field; and when a relatively lower channel SNR exists, using a relatively lower order modulation for the high throughput signal field.

5. A method for determining a format of an Orthogonal Frequency Division Multiplexed (OFDM) data frame within a multiple input multiple output (MIMO) wireless communication, the method comprising:

receiving an OFDM data frame that includes a preamble and a data field;

determining a modulation format of a high throughput signal field of the preamble;

when the high throughput signal field has a first modulation format, determining that the preamble is of a first preamble format that includes one QPSK OFDM symbol and that the data frame is of a first type;

when the high throughput signal field has a second modulation format, determining that the preamble is of a second preamble format that includes two BPSK OFDM symbols that are both rotated by 90 degrees and that the data frame is of a second type; and when the high throughput signal field has a third modulation format, determining that the preamble is of a third preamble format that includes two BPSK OFDM symbols, one of which is rotated by 90 degrees and that the data frame is of a third type;

wherein the first preamble format, the second preamble format and the third preamble format are indicative of a channel signal to noise ratio (SNR) between a transmitting MIMO wireless device and a receiving MIMO wireless device such that:

when a relatively higher channel signal to noise ratio (SNR) exists, a relatively higher order modulation for the high throughput signal field is used; and when a relatively lower channel SNR exists, a relatively lower order modulation for the high throughput signal field is used.

6. The method of claim 5, further comprising, when the high throughput signal field has the first modulation format and a legacy signal field of the preamble indicates a particular data rate, determining that the preamble is of a legacy preamble format and that the data frame is of a legacy type.

* * * * *